Nov. 13, 1928.
J. E. THORNTON
1,691,414
CINEMATOGRAPH SPOOL CASE
Filed Jan. 26, 1927    5 Sheets-Sheet 1
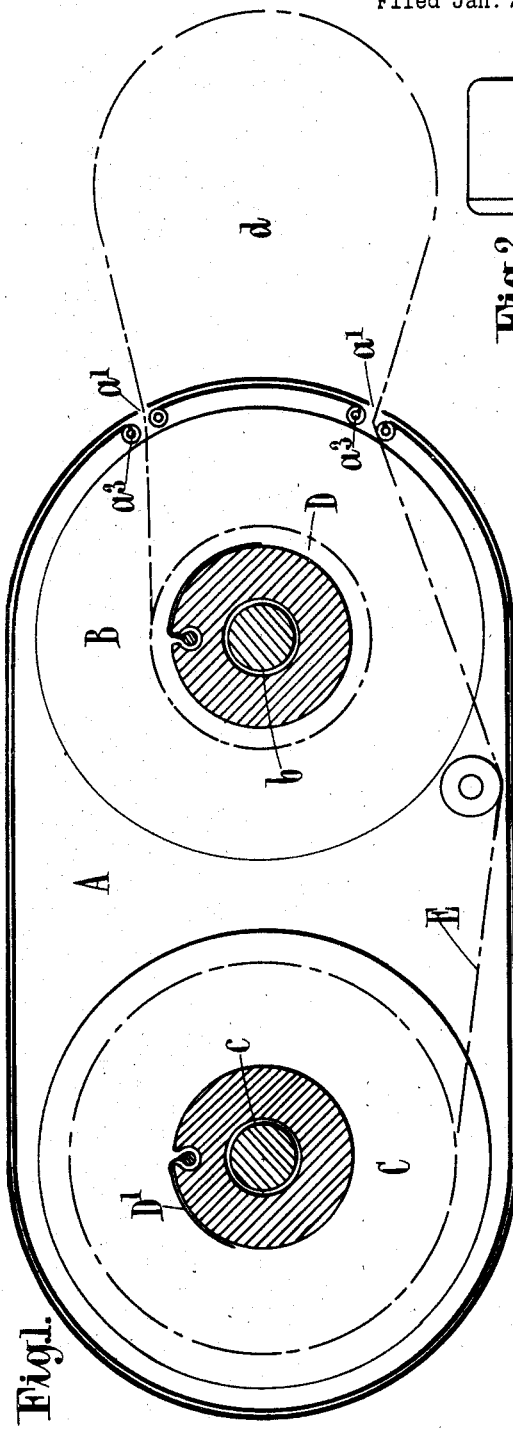
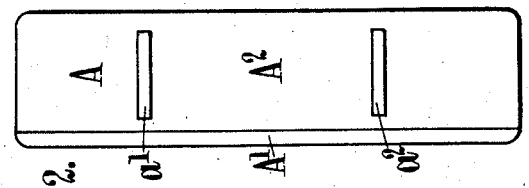
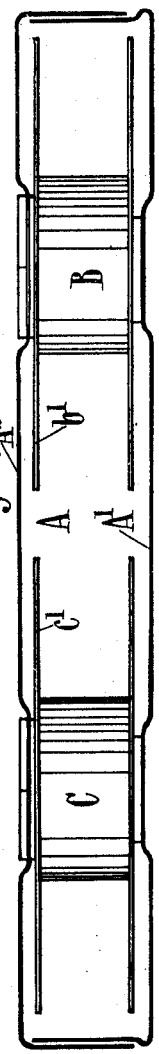
INVENTOR
J. E. Thornton
BY
J. Owden O'Brien
ATTORNEY Nov. 13, 1928. 1,691,414
J. E. THORNTON
CINEMATOGRAPH SPOOL CASE
Filed Jan. 26, 1927  5 Sheets-Sheet 2
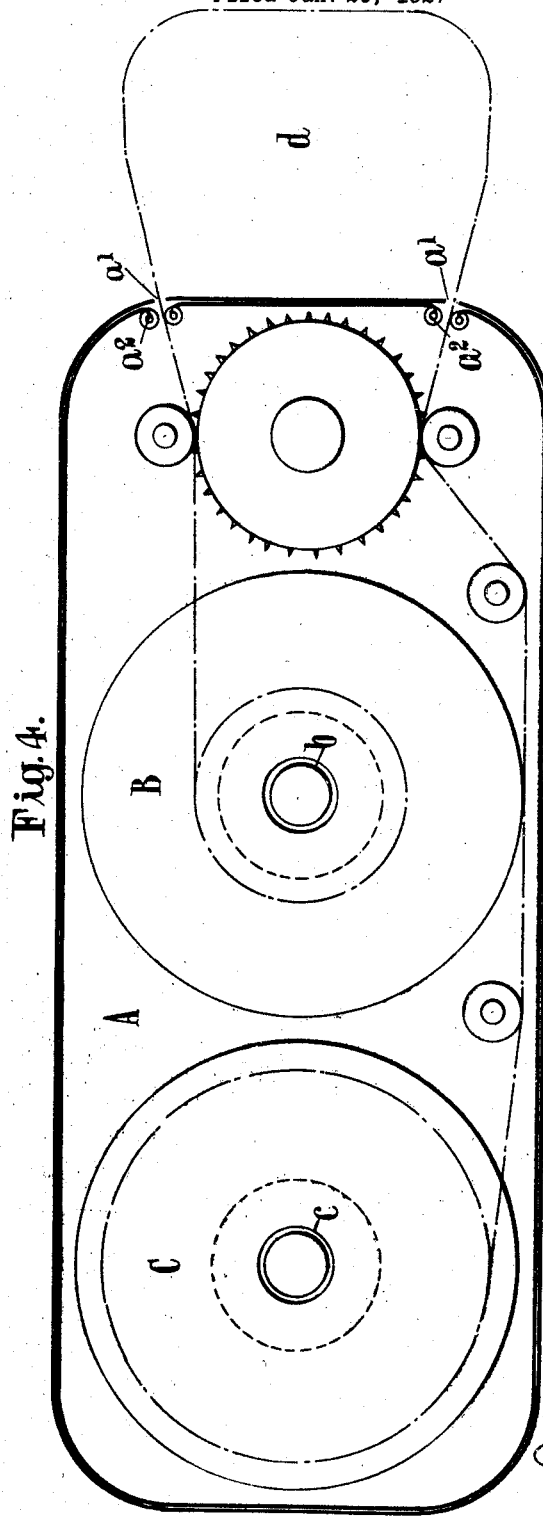
INVENTOR
J. E. Thornton
BY
J. Owden O'Brien
ATTORNEY Nov. 13, 1928. 1,691,414
J. E. THORNTON
CINEMATOGRAPH SPOOL CASE
Filed Jan. 26, 1927 5 Sheets-Sheet 3
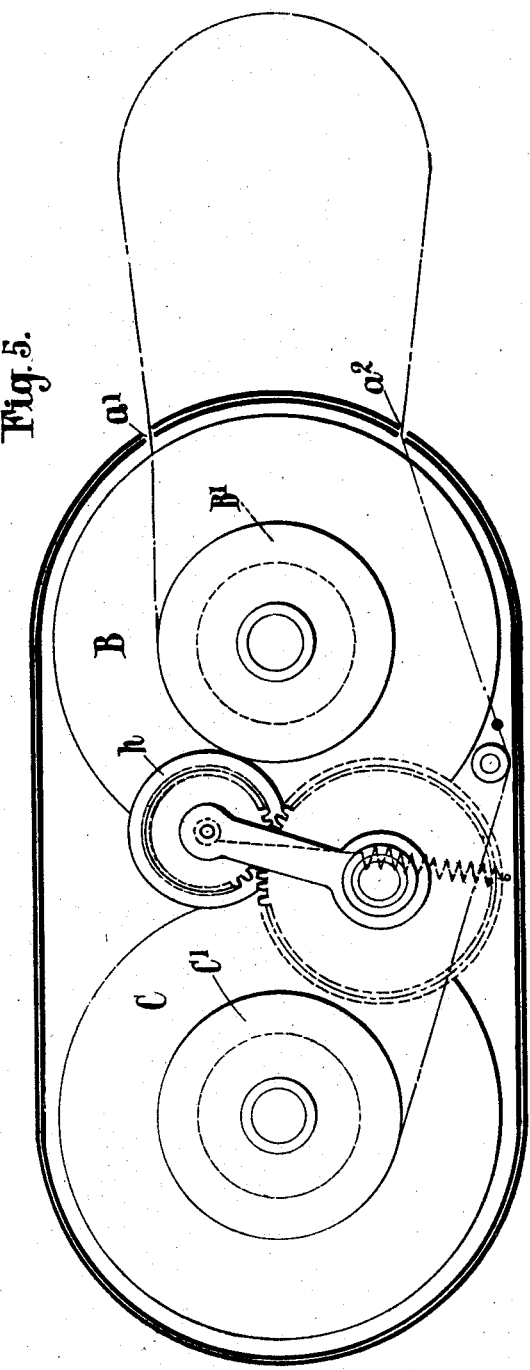
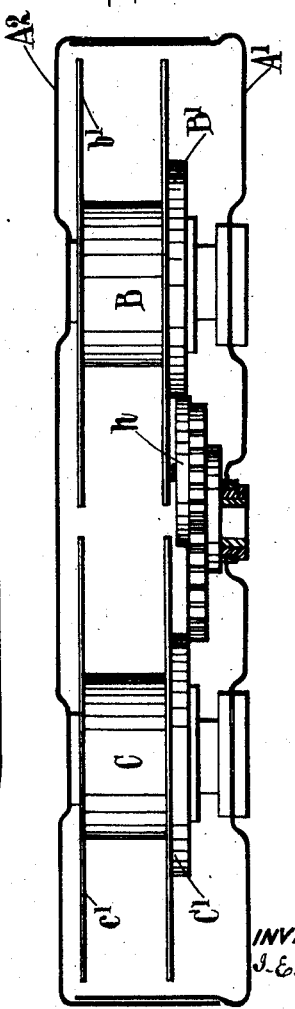
INVENTOR
J. E. Thornton
BY
Owden O'Brien
ATTORNEY Nov. 13, 1928.
J. E. THORNTON
1,691,414
CINEMATOGRAPH SPOOL CASE
Filed Jan. 26, 1927     5 Sheets-Sheet 4
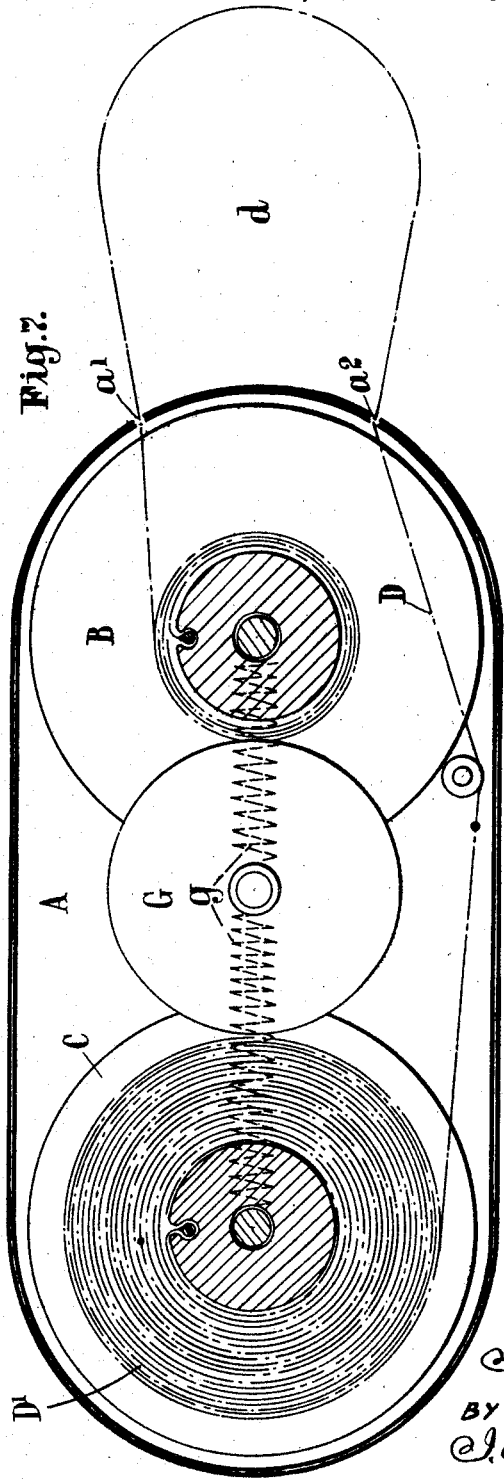
INVENTOR
J. E. Thornton.
BY
J. Owden O'Brien.
ATTORNEY Nov. 13, 1928.　　　　　　　　　　　　　　1,691,414
J. E. THORNTON
CINEMATOGRAPH SPOOL CASE
Filed Jan. 26, 1927　　　　5 Sheets-Sheet 5

INVENTOR
J. E. Thornton
BY
J. Owden O'Brien
ATTORNEY

Patented Nov. 13, 1928.

1,691,414

UNITED STATES PATENT OFFICE.

JOHN EDWARD THORNTON, OF WEST HAMPSTEAD, LONDON, ENGLAND.

CINEMATOGRAPH SPOOLCASE.

Application filed January 26, 1927, Serial No. 163,804, and in Great Britain February 11, 1926.

The object of this invention is to provide an improved design of spoolcase to contain cinematograph film for use in combination with any suitable design of projector or camera, the spoolcase and its film and the operative parts being so constructed that the case encloses a supply-spool having an unbreakable leader strip permanently secured thereto with its other end secured to one end of the film, and a receiving reel having an unbreakable leader strip permanently secured thereto with its other end secured to the other end of the film, so that the film may be drawn off the spool by turning the reel, or given a reverse motion to draw it off the reel and rewind it upon its original spool, the film passing out from and back into the spoolcase by means of suitable slots at its forward end during its passage from spool to reel upon its travel through projector or camera.

The effect of this construction is to produce a spoolcase carrying a spool, reel and entire film contents which are capable of reversible motion and this spoolcase serves the purpose of a parmanent storage case for the film before, during, and after use in the projector or camera, and in which the film cannot become detached from spool or reel during use.

The invention can be applied to the use of double-width film having two rows of pictures, one of which is inverted; or to two single-width films used side by side (one being inverted) with double-width spools and reels (or pairs); or to single-width film having two groups of pictures in a single row which are alternately interspersed; all these several arrangements of film being designed to operate with reversible motion mechanism in order that the film may be returned to its original spool during use, instead of by the usual separate troublesome rewinding operation after use.

The reversible-motion cinematograph spoolcase having an outwardly extending loop of film-leader forming the present invention comprises the combination of the following parts:—

A. An enclosing case having one or two slots in one wall thereof through which the film and its leader-strip can pass out of the case and again into the case, forming a loop outside of the case, between the points of egress and ingress;

B. Two spools mounted inside the case, forming a supply spool and receiving-reel respectively, each capable of being driven in either direction;

C. A film having at each end a leader-strip, the two ends of which are secured respectively to the two spools, the film being provided with suitable feed perforations and control or stopping devices; the spoolcase being adapted to engage with a projector or camera mechanism, and the film being adapted to engage with a film feeding device outside the spoolcase and forming part of the projector or camera mechanism.

The invention is illustrated by the accompanying drawings in which:—

Fig. 1 shows a vertical section through a simple form of the invention, the case having two slots through which the leader-strip and film pass.

Fig. 2 is an end view of Fig. 1.

Fig. 3 is an horizontal section through Fig. 1.

Fig. 4 is a vertical section through another form of spoolcase similar to Fig. 1, but having a driven feed-sprocket which positively governs the length of loop; such feed-sprocket being additional to the feed device on the projector or camera.

Fig. 5 is a vertical section through a spoolcase provided with a spring held friction driving roller which can be moved into contact with either spool leaving the other free.

Fig. 6 is a horizontal section through Fig. 5.

Fig. 7 is a vertical section through a spoolcase provided with a continuously driven central friction driving roll against which the spools of varying diameter are drawn and held by springs.

Figure 8:
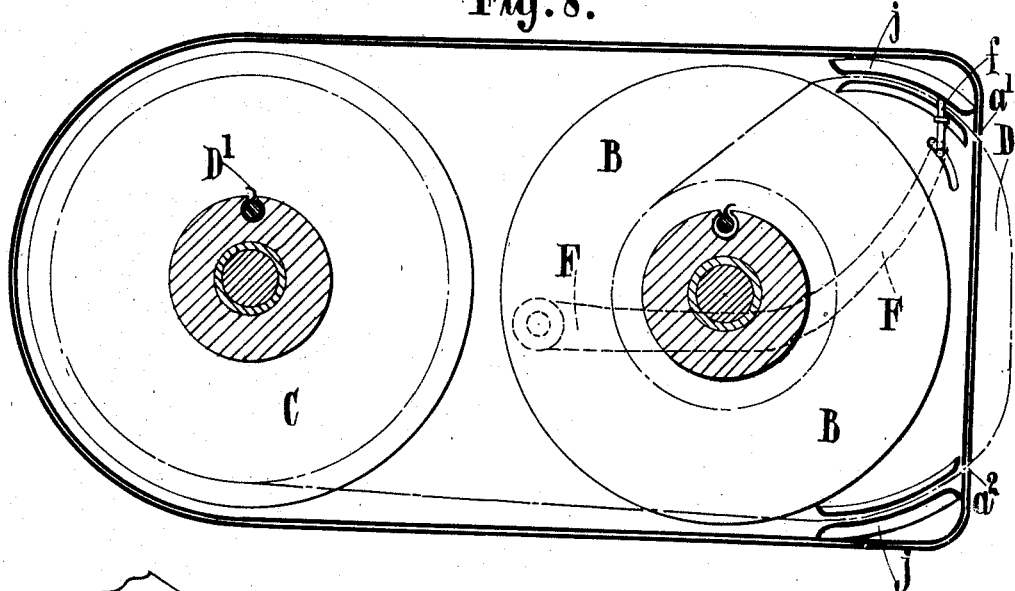
Fig. 8 is a vertical section through a spoolcase for use in a camera provided with light channels to prevent light reaching the interior and fogging the sensitized film, and with a film locking device.

Spoolcase.

The spoolcase A may be constructed in various ways, a preferred form as shown in Figs. 2 and 6 comprising two shallow trays $A^1$, $A^2$ which fit one over the other like a box and lid, such case preferably being stamped or drawn from thin sheet aluminum and suitably ribbed to stiffen it. The case when closed may be secured by a suitable locking device which may be of a secret character, only openable by the manufacturer or other controller of the film-contents.

Slots $a^1$, $a^2$ for the egress and ingress of the film are formed at one end of the case A, and to prevent the film from being damaged by coming into contact with a sharp edge rollers or curved portions $a^3$ are preferably provided inside the case above and below each slot. These rollers or curved portions may be formed by bending over the material from which the case is made or separate rollers mounted on pins may be employed.

Although the tandem horizontal type of spoolcase as drawn is preferred, the invention can be used with vertical type spoolcase in which one spool is above the other and film loop comes out on the long side wall.

Spool and reel.

The spool B and reel C are mounted to rotate freely upon tubular pillars or posts $b$, $c$ which form integral parts with one or both side walls $A^1$, $A^2$ of the spoolcase. Any other suitable method of mounting may be substituted, such as solid spindles. The leader-strip D is secured to the spool or reel in any suitable manner, a convenient and secure method being to secure it as described in the specification of application No. 25,159 of 1926.

The spool B and reel C are preferably formed with flanges $b^1$, $c^1$ of very light thin metal suitably ribbed to stiffen them. A tubular centre is drawn from the flange and forced on to a tubular core of metal or wood.

If preferred the flanges may be omitted entirely, in which case the film simply winds upon plain cores and is guided or positioned thereon by the side walls of the case.

The receiving reel C is placed in the case at its forword end and the supply-spool B at the rear end in tandem fashion one behind the other, though their respective positions may be reversed if desired.

Leaders strips.

The term "unbreakable leader strip" is intended to differentiate the leader used in this invention from the ordinary leader strip which in some small apparatus for amateur use consist of paper which can easily be torn and severed by a hard pull or jerk of the film-strip.

The present leader-strip is made of very strong construction, for example a double thickness of linen tape, or a double thickness of paper with a linen tape insertion, the three layers being cemented together, or a double thickness of strong parchmentized paper cemented together.

The leader-strip D is permanently attached to the spool B by one end and to the film E by its other end, and is of sufficient length to make several turns round the spool, and also of sufficient length that when withdrawn from the spoolcase A through one of the slots it can be made into a large slack loop $d$ see Figs. 1, 4, 5 and 7. The other end of the film E is attached to a second leader-strip $D^1$ which is permanently secured to the reel C.

There are thus two such leader-strips of long length, one attached to each end of the film, one leader being attached by its other end to the spool and one to the reel.

The effect of this arrangement is to permanently connect spool B and reel C so that either one or the other can be used to give motion to the film-strip E. And the effect of the two leader-strips is to form two extension pieces of such strength that they can be manipulated by the operator without damage, to a degree that would not be equally possible with an extension of film-material itself or of a thin paper leader attached thereto.

Figure 9:
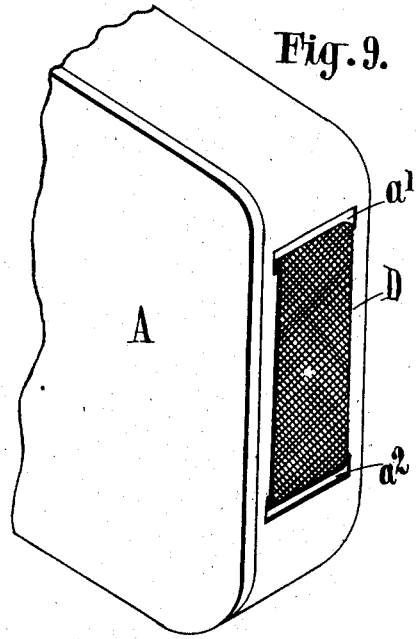
Fig. 9 is a perspective view of the end of a spoolcase for a projector showing the leader-strip passing from one slot to the other.

Down the centre of the leader-strip $D^1$ is cut a very long slot, through which passes a pin $f$ see Fig. 8, the object of which is to control the film's movement. This pin $f$ is in engagement with the leader whilst the spoolcase is not in operative engagement with the projector or camera mechanism, and whilst the whole of the film and the major portion of the forward leader is drawn into the case and coiled upon the supply-spool prior to use. Therefore only a small portion of the forward leader-strip $D^1$ alone remains outside the case lying flatly outside upon the forward end wall of the case A as shown in Fig. 9.

The pin $f$ is carried at the end of two spring controlled arms F which are moved when the spoolcase A is placed in the camera or projector as described in specification of application No. 25,158 of 1926 to cause the locking pin $f$ to be withdrawn from the slot in leader-strip $D^1$.

Perforations.

The film-strip E is provided with suitable perforations for traction purposes, which engage with feed sprockets, feed-claws, or other suitable mechanisms for operating the film.

These perforations may be of any known type, for example:—on a single-width film they may be placed in the two side blank margins of the film, or they may be placed on its centre line between each picture; on a double-width film they may be placed in the two outer blank margins; or they may be placed on two lines central with each row of pictures and between each picture of each row; but I prefer to place them as a single central line in the blank margin between the two rows of pictures, an arrangement which ensures the shortest film-length and the greatest protection against damage to the perforations.

Operation of the spoolcase.

Assuming that the film together with its leaders is already wound upon the supply-spool B, and that the spoolcase is about to be used in a suitable projector, the operator first takes hold of the leader $D^1$ lying upon the outside of the front end of the case and pulls it out as far as possible until further withdrawal is prevented by the locking pin which is already in the slot of the leader. Thus a large loop $d$ of leader-strip is formed and left protruding at the forward end of the case. The spoolcase is next dropped into its working position in the projector, the free loop $d$ is slipped over the fed mechanism and suitably adjusted thereon, and the apparatus is then ready for work because the mere act of placing the spoolcase in position causes the locking pin $f$ to be withdrawn from the leader-slot, thus leaving the film and its leader quite free to travel. The arrangement is intended to prevent the operator withdrawing or damaging the film portion of the strip. He cannot finger it because it is only free to travel when the spoolcase and projector or camera are interlocked, at which stage the film is protected and covered.

As soon as the mechanism is set in motion first the leader-strip and then its following film is withdrawn from the supply-spool through one slot of the spoolcase, and after passing the lens and exhibiting point it re-enters the spoolcase by the other slot and is taken up or re-wound on to the receiving reel. When all the film has been withdrawn it is followed by the other leader-strip.

At this point, if it is not desired to rewind the film (as would be the case with a single film used only once for photographing in a camera), the spoolcase may be at once removed from the apparatus by detaching the loop, which can then be wound up into the spoolcase.

But as the main object is to provide a reversible film which can be rewound on to the original spool whilst running in use (as would be the case when the spoolcase is used in a projector for exhibiting pictures) the motion of the mechanism is reversed at this point, whereupon the film at once commences to rewind on to the supply-spool.

It will be understood that at this stage the method will be varied according to the type of film with which the apparatus is being used. For example, if the film is a single-width strip with its pictures alternately placed as described in specification No. 31,311 of 1925 it is merely necessary to reverse the direction of the film's travel. But if the film is of double-width with two rows of pictures, it is also necessary to laterally displace the spoolcase in order to bring the second row of pictures opposite the lens, as well as reversing the direction of the film's movement. This lateral displacement is provided for by the projector mechanism and forms no part of the present invention. Alternatively, the same effect can be produced by removing and replacing the spoolcase in an inverted position, thus bringing the second row of pictures opposite the lens. When used in a camera for photographing this method allows two sets of pictures to be made upon a double-width film by merely reversing the spoolcase.

Driving the film.

A spoolcase such as described is suitable for use with several different kinds of projectors and driving mechanism. For example:—

One much used type of projector or camera mechanism uses a continuously rotating sprocket to engage with the film and feed it forward continuously, and in another type a reciprocating pin or claw movement is utilized to intermittently shift the film by intermittent engagement with the perforations. In such apparatus the leader-loop is placed in engagement with the continuous sprocket and then passed over the platen of the usual spring gate, where it is engaged by the intermittent pin or claw.

Another type of projector described in some of my patents dispenses with the continuous sprocket and claw, and uses instead an intermittent sprocket drum of large diameter which not only serves to draw the film forward and feed it back into the case, but in addition serves as an exposure platen which dispenses with a spring-gate entirely. In this case the loop is merely placed over and around the drum.

In another form of apparatus the large intermittent drum and small continuous sprocket are both used in combination, and the loop is similarly passed over both sprockets.

All these film-shifting and feeding devices form parts of the projector or camera, and form no part of the present invention but are described in order to make its operation clear.

Driving the spool and reel.

In some forms of projector or camera the reel is driven during re-wind by a slipping wire-belt and pulley of the usual type, which forms part of the apparatus and not of the spoolcase. In some cases friction driving discs or wheels are used instead.

In the present invention such re-wind apparatus may be included in the spoolcase itself, either as a slipping belt, friction disc, or otherwise.

One convenient arrangement see Fig. 7 comprises a rubber wheel G so mounted by the springs $g$ that it can float and lightly press upon the film contained upon both spool B and reel C, so that it accommodates to the varying diameter of either, and the film is wound upon the reel through the frictional drive by rotation of the spool. This gives the same surface speed to the outer layer of both film-coils.

Another form of friction drive is shown in Figs. 5 and 6. In this case a friction disc H is mounted on a pivoted arm $h$ so that it can be moved into engagement with one or other of the wheels $B^1$ or $C^1$ attached to or forming part of the spool B or reel C.

Light tight devices.

When the spoolcase A is for use in a camera it may be provided with two curved channels J as shown in Fig. 8 adjacent to the slots $a, a^1$, the film E travelling along such channels before passing out of the case and again after re-entering it, so that light is prevented from passing to the sensitive film on the spool B and reel C.

Figure 10:
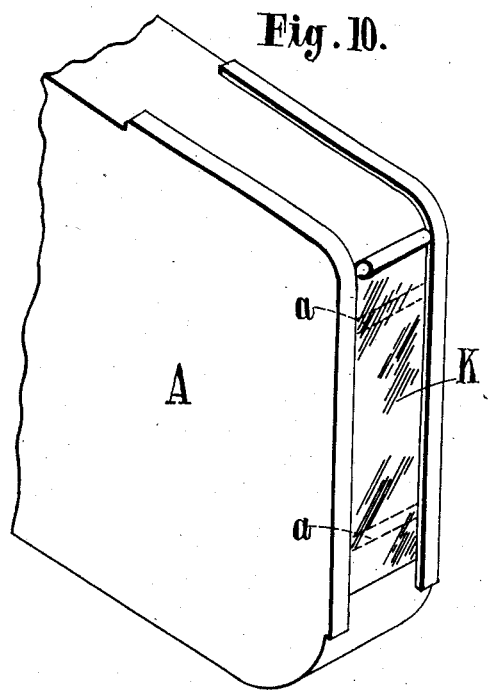
Fig. 10 is a perspective view of the end of a spoolcase for a camera and provided with a sliding shutter.
Figure 11:
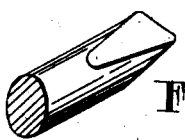
Fig. 11 is a perspective view of the spindle of the projector or camera apparatus for controlling the film locking device as shown in Fig. 8.

The spoolcase A may also be provided with an external shutter K as shown in Fig. 10 to cover the slots $a, a^1$ when the case is not in use.

Modifications and additions.

The leader-strips may be provided with perforated wording indicating to the operator the necessity for reversing the movement, or for indicating the approaching end of its travel, or other instructions. The leader-strips may if desired, be made of semi-transparent material to admit a small amount of light to the screen or they may be opaque in order to shut off the light entirely.

A spoolcase such as described forms a complete piece of film mechanism in which the film is completely protected from being tampered with or damaged except the loop portion; which is so strong that little or no damage is possible. It forms a complete reservoir for the whole of the film—both before and after exposure or exhibition. And because both spool and reel are contained in the one spoolcase there is no connecting or threading operation every time the apparatus is reloaded with a new film.

What I claim as my invention and desire to protect by Letters Patent is:

1. A cinematograph film spool case and a film-strip having its film-feed effected and controlled partly inside the spoolcase itself and partly by the camera or projector mechanism outside the spoolcase, the spoolcase and film-strip comprising in its construction a suitable enclosing case, having openings in one wall thereof, through which the film and its leader-strip can pass out of the case and again into the case forming a loop outside the case between the point of egress and ingress and inside the case two spools to form a supply-spool and a receiving-reel respectively, two feed-controlling leader-strips permanently attached, one to each spool, a film secured by its two ends to the two leader-strips attached to the two spools; the mechanism being rotatable in both directions a first group of pictures being exposed during the forward movement of the film and a second group during the return movement of the film; the spoolcase being adapted to engage with the exposure driving-mechanism, whereby the spoolcase mechanism is driven by the exposure mechanism in both directions without the operator having to change the spools.

2. Cinematograph film spoolcase as in claim 1 provided with an auxiliary feed sprocket placed between the supply-spool and the winding reel so that the strain of the spools and film will be taken by the sprocket and the only weight of the film between the sprocket and film feed will be taken by the feed apparatus.

In testimony whereof I have hereunto set my hand.

JOHN EDWARD THORNTON.